Patented July 12, 1949

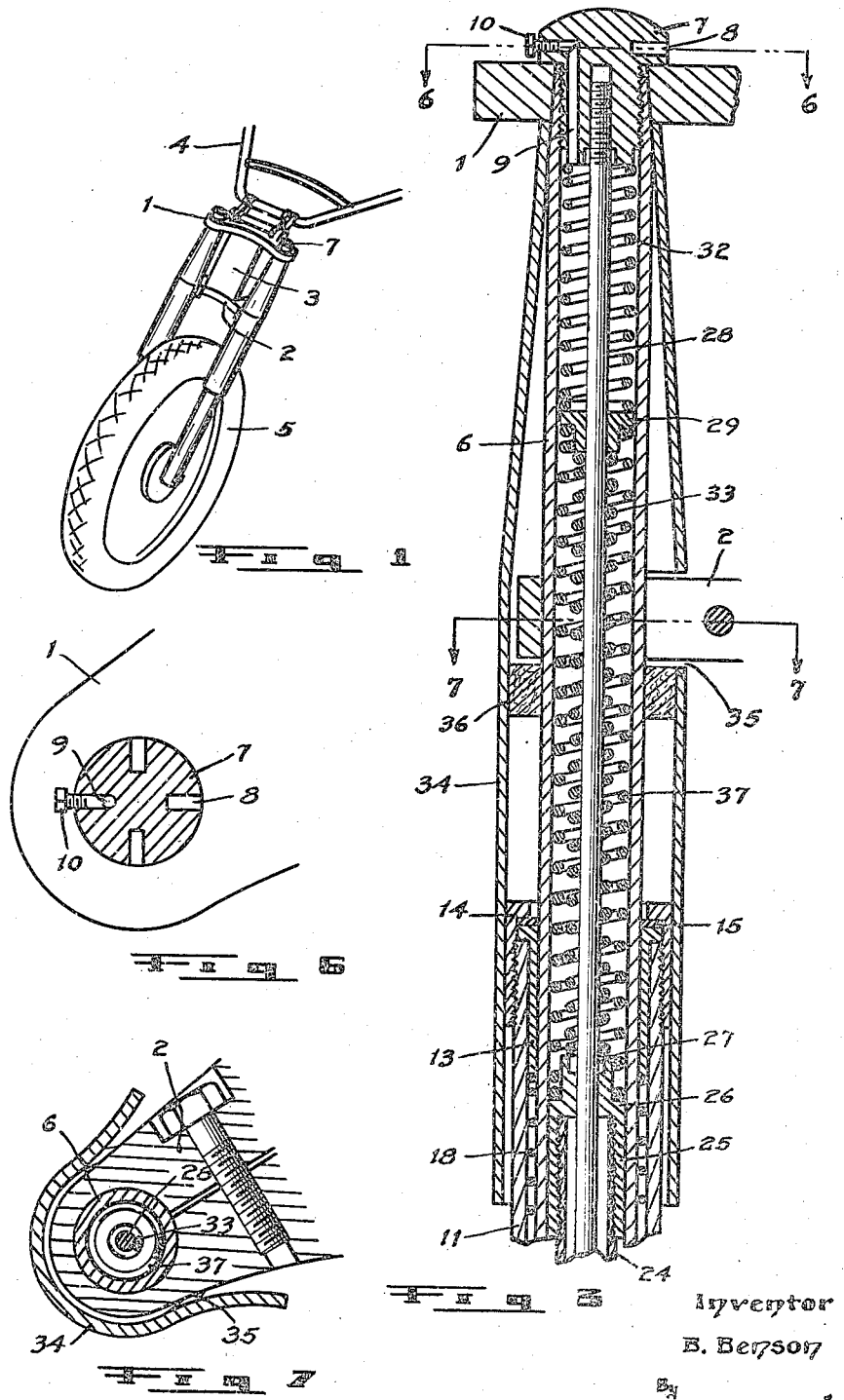

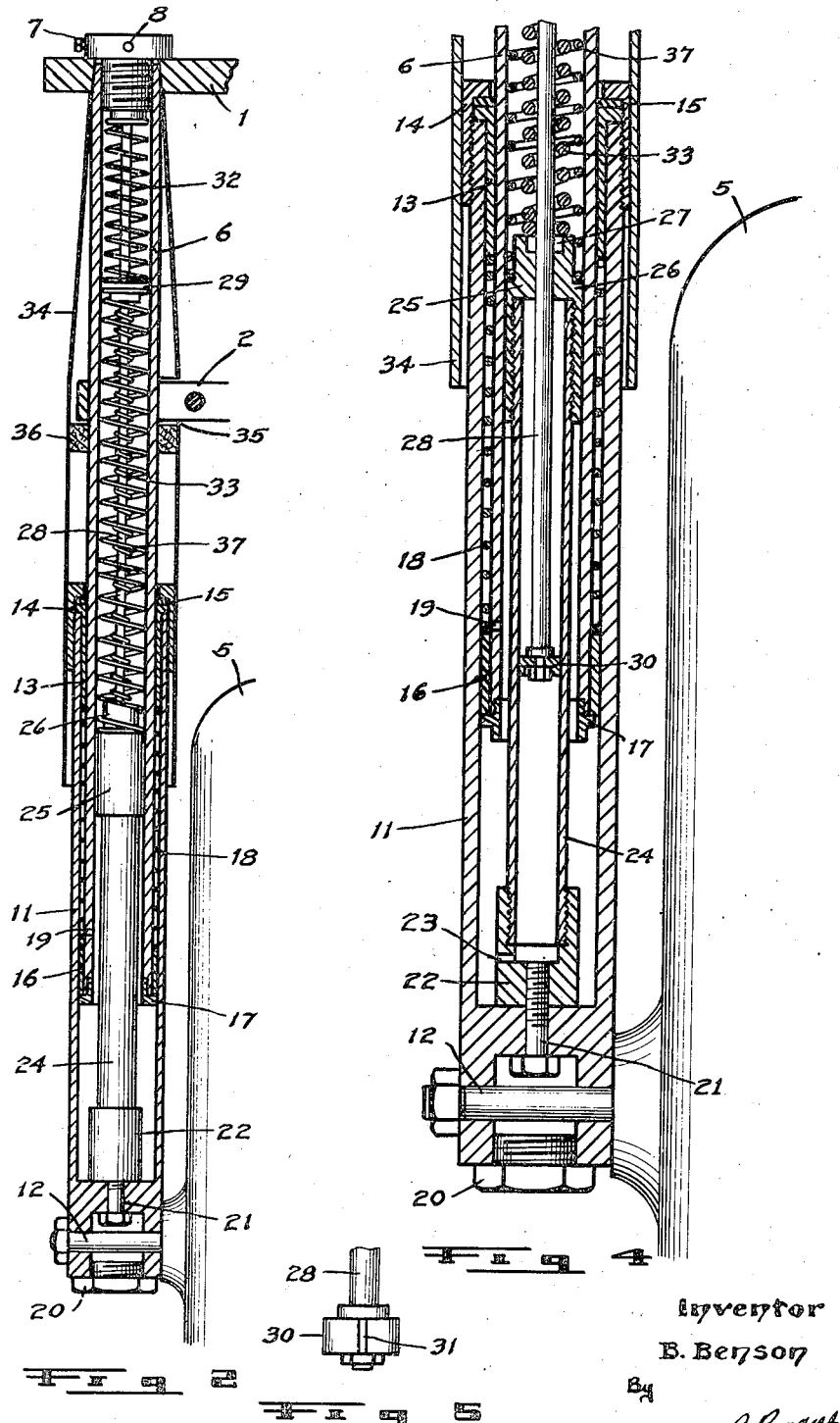

2,475,774

UNITED STATES PATENT OFFICE 2,475,774

FORK FOR MOTORCYCLES

Ben Benson, Winnipeg, Manitoba, Canada

Application January 6, 1948, Serial No. 659

1 Claim. (Cl. 280—276)

The invention particularly relates to the front fork connection between the frame and front wheel of a motor cycle, and the principle object of the invention is to provide a shock absorber construction in this connection so that the machine will pass smoothly over irregularities of the road at all speeds.

A further object of the invention is to provide means for absorbing light shocks, means for absorbing heavy shocks, means for absorbing the recoil from the shocks and removable shock absorbing means for use when the machine is equipped for commercial purposes or carrying a side car.

A still further object of the invention is to provide lubricating means, operated by the shock absorbing mechanism, for oiling the various working surfaces.

With the above important objects in view which will become more apparent as the description proceeds, the invention consists essentially in the construction and arrangement of parts, hereinafter more particularly described, reference being had to the accompanying drawings in which:

Figure 1 is a perspective view of the front forks, handle bars and front wheel of a motor cycle equipped with my invention.

Figure 2 is an enlarged vertical section through one of the forks shown in Figure 1.

Figure 3 is an enlarged partial section of the upper part of the fork shown in Figure 2.

Figure 4 is an enlarged partial section of the lower part of the fork shown in Figure 2.

Figure 5 is an enlarged side view of the piston.

Figure 6 is a horizontal section taken at 6—6, Figure 3.

Figure 7 is a horizontal section taken at 7—7, Figure 3.

In the drawings, like characters of reference indicate corresponding parts in the several figures.

A pair of triangular shaped plates 1 and 2 are shown in Figure 1 and these plates are connected to and spaced apart by a channel shaped plate 3. The upper plate 1 is connected to the handle bars 4 and the rear parts of the plates 1 and 2 span and are pivoted to the front of the motor cycle frame (not shown), so that the handle bars can swing the plates on the frame for steering purposes. The bottom face of the lower plate 2 is adapted to support a mudguard (not shown) for the front wheel 5 while the front face of the channel 3 is adapted to support the headlights, horn, et cetera (not shown).

The outer corners of the plate 1 are provided with tapered holes to receive the tapered ends of downwardly extending tubings 6, one in each fork. As both forks are alike, only one will herein be described. A circular clamping nut 7 has the lower end screwed into the upper end of the tubing 6 so that, when tightened, the enlarged head of the nut contacts the plate 1 and draws the tubing tightly into the tapered hole. Suitable holes 8 are provided around the periphery of the nut for wrench purposes while a passage 9, closed by a bolt 10, is provided for passage of oil into the fork. A hole is bored through each of the outer corners of the plate 2 for the tubings 6 to pass through, so that the plates 1 and 2, channel 3 and the tubings 6 form a fixed unit.

A cylindrical casing 11 has the lower end pivotally mounted on an axle 12 of the wheel 5. The upper end of this casing is provided with an interior bushing 13 which slidably receives the tubing 6, while the bushing is held in place by a circular nut 14, packing 15 being provided therebetween to prevent oil leakage. The lower end of the tubing 6 extends down into the casing 11 and the extreme end is provided with a bushing 16, held in place by a nut 17, screwed into the bottom of the tubing. The two bushings 13 and 16 align the tubing 6 within the casing 11 so that the two can slidably telescope. A coil spring 18 is inserted around the tubing and between the two bushings for a purpose later described and is adapted to receive oil from the interior of the casing through a hole 19 in the tubing, just above the bushing 16.

The lower end of the casing 11 is counterbored and closed by a screw cap 20 so that, when the axle 12 is removed, entrance is provided, through the counterbore, to a cap screw 21 which holds a cup shaped member 22 in place on the bottom of the casing. This cup member is provided with an oil passage 23 and also threadedly receives a cylinder 24 which projects upwardly. The upper end of the cylinder is closed by a circular nut 25 which is slidably mounted inside the tubing 6 to form a bushing and so align the cylinder both with the tubing 6 and the casing 11. This nut is provided with an encircling step 26 and an orifice 27 which acts as an oil reservoir.

A shaft 28 has one end threaded into the clamping nut 7 while the other end projects downwardly inside the fork, through a washer 29 which is loose thereon, through the cylinder nut 25, and its extremity is provided with a piston 30 which rides the walls of the cylinder. The surface of the piston is provided with a groove 31 for passage of oil therepast in the operation of the mechanism. A light coil spring 32 encircles the shaft between the clamping nut 7 and the washer 29. A heavy coil spring 33 encircles the shaft between the washer 29 and the cylinder nut 25.

A tubular dust casing 34, having the upper end tapered, is passed over the tubing 6. The tapered end is caught by the upper taper of the tubing 6 so that when the clamping nut 7 is tightened this casing is held firmly to the plate 1. The lower end of the dust casing slides over the circular nut 14, which acts as a bushing. Just below the taper, the sides of the casing is cut to provide a rectangular hole 35 for the entrance of the plate 2 to the tubing 6, and just below this hole, felt packing 36 is provided in the casing to prevent dust passing down to the bushings.

When the motor cycle is to be used for commercial work or a side car is added, a further coil spring 37 is placed around the coil spring 33, one end encircling the lower end of the washer 29 and the other end encircling and held in the step 26 of the cylinder nut 25.

To disassemble the device, the clamping nut 7 is removed. The nut unscrews from both the tubing 6 and the shaft 28 so that the wheel 5, casing 11, including contents, and the tubing 6, can be removed from the plates 1 and 2. In this movement, the casing 11 slides out of the dust casing 34, and as the tubing 6 also slides out of the plate 2, the dust casing is free to slide sideways off the plate 2. By removing the circular nut 14, the tubing 6 can be withdrawn from the casing 11 to expose the springs. By unscrewing the cylinder nut 25, the piston can be withdrawn from the cylinder 24. The axle 12 on the wheel 5 is removed and it is then only necessary to remove the screw cap 20 and release the cap screw to withdraw the cylinder 24 and the cup member 22 as a unit from the casing 11.

In operation, any jar from the wheel 5 is transmitted through the cylinders 24 to be absorbed by the springs 33 and 32, the tubings 6 and dust casing 34 sliding past the casing 11. The light springs 32, being very resilient, absorb the light shocks, but when they are fully compressed under a heavy shock, the balance of said shock is taken by the heavier springs 33. On the return movement of the parts, the recoil is absorbed by the springs 18 which are between the bushings 13 and 16. With such a construction, the frame of the motor cycle is resiliently supported from the wheel 5 between double springs and accordingly, is always in a floating condition. When a side car is used or commercial attachments, the extra load creates an excessive strain on the springs 33. By adding the auxiliary encircling spring 37, the two springs combined have ample capacity to carry such loads.

In order to lubricate the various working parts, oil is passed into the forks through the passage 9. This oil works its way down past the various bushings or through the cylinder and collects at the lower end of the casing 11. As the cylinders 24 move up and down, the pistons 30 move the oil back and forth through the passages 23. The oil rising in the casing 11 passes through the holes 19 to lubricate the bushings 16, the springs 18, which carry it up to the bushings 13. On the up movement of the cylinders, oil by-passes the pistons, through the slots 31, and on the return movement fills the orifices 27. These orifices act as reservoirs to continually lubricate the upper springs and some spills over to lubricate the interior walls of the tubings 6.

A motor cycle equipped with this fork support really gives the driver a floating ride. The springs, all working together, form a continuous cushion which permits the machine to ride over the roughest terrain at comparatively high speeds without noticeable vibration. The lubrication system is constantly working as the machine is operated, never gives trouble and the oil loss over a period of time is negligible. If any part breaks, the forks can be dismantled quickly without requiring special tools and the part quickly repaired or replaced.

What I claim as my invention is:

In a motor cycle, having a pair of spaced horizontal plates pivoted to the frame and controlled by a pair of handle bars for steering purposes; a front fork support therefor, comprising: a tubing releasably secured to the upper of said plates, passing through said plates and with the lower end projecting downwardly therefrom, a casing, having the lower end pivotally supported by the axle of the front wheel of said motor cycle and the upper end telescopically receiving the lower end of said tubing; a cylinder mounted within said casing, extending upwardly into said tubing; a piston mounted in said cylinder; a shaft positioned in said tubing and connecting said piston to the upper of said plates; a pair of coil springs of different strengths mounted in series on said shaft, within said tubing, between said cylinder and said upper plate and with a washer interposed therebetween and slidable on said shaft; a coil spring encircling said tubing and positioned between the lower end of said tubing and the upper end of said casing and resiliently acting thereagainst; and a dust casing enclosing said tubing and telescopically slidable over said first mentioned casing; a hole at the bottom of said cylinder connecting same with said first mentioned casing; a hole in said tubing for passage of oil from said first mentioned casing to said tubing encircling spring; and an oil by-pass slot across the outer wall of said piston.

BEN BENSON.

REFERENCES CITED

The following references are of record in the file of this patent:

UNITED STATES PATENTS

| Number | Name | Date |
| --- | --- | --- |
| 940,245 | Gates | Nov. 16, 1909 |

FOREIGN PATENTS

| Number | Country | Date |
| --- | --- | --- |
| 19,424 | Great Britain | 1910 |
| 500,810 | Great Britain | Feb. 16, 1939 |